(12) United States Patent
Woo et al.

(10) Patent No.: US 11,201,338 B2
(45) Date of Patent: Dec. 14, 2021

(54) FUEL CELL EXHAUST DEVICE

(71) Applicant: LG Electronics Inc., Seoul (KR)

(72) Inventors: Hyoungsuk Woo, Seoul (KR); Dongkeun Yang, Seoul (KR); Woojin Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/999,452

(22) Filed: Aug. 21, 2020

(65) Prior Publication Data

US 2021/0057768 A1  Feb. 25, 2021

(30) Foreign Application Priority Data

Aug. 23, 2019 (KR) .......................... 10-2019-0103760

(51) Int. Cl.
| | | |
|---|---|---|
| *H01M 8/04119* | (2016.01) | |
| *H01M 8/04746* | (2016.01) | |
| *H01M 8/04492* | (2016.01) | |
| *H01M 8/0612* | (2016.01) | |

(52) U.S. Cl.
CPC ... *H01M 8/04164* (2013.01); *H01M 8/04522* (2013.01); *H01M 8/04776* (2013.01); *H01M 8/0618* (2013.01)

(58) Field of Classification Search
CPC ......... H01M 8/04164; H01M 8/04776; H01M 8/04522; H01M 8/0618; H01M 8/04761; H01M 8/04492; H01M 8/0662; H01M 8/04156
See application file for complete search history.

(56) References Cited

U.S. PATENT DOCUMENTS

| | | | | |
|---|---|---|---|---|
| 2004/0197622 A1* | 10/2004 | Wheat | .................... | B01D 45/12 429/413 |
| 2010/0297512 A1* | 11/2010 | Shinoda | ............ | H01M 8/04164 429/423 |
| 2012/0135322 A1* | 5/2012 | Yoshimine | ........ | H01M 8/04164 429/410 |

* cited by examiner

*Primary Examiner* — Stewart A Fraser
(74) *Attorney, Agent, or Firm* — Fish & Richardson P.C.

(57) ABSTRACT

A fuel cell exhaust device includes a pipe having one side open and the other side closed, a water tank having one side open and the other side closed, a reformer exhaust pipe communicating with the pipe between one side and the other side of the pipe, a stack exhaust pipe which is spaced apart from the reformer exhaust pipe and communicates with the pipe between one side and the other side of the pipe, a drain pipe positioned adjacent to the reformer exhaust pipe or the stack exhaust pipe and disposed on an outer circumferential surface of the water tank to communicate with the inside of the water tank, and a hole defined on the closed other side of the pipe and spaced apart from the closed other side of the water tank.

7 Claims, 6 Drawing Sheets

FUEL CELL EXHAUST DEVICE

CROSS-REFERENCE TO RELATED APPLICATION

This application claims the priority from Korean Patent Application No. 10-2019-0103760, filed on Aug. 23, 2019, the disclosure of which is incorporated herein by reference in its entirety.

TECHNICAL FIELD

The present disclosure relates to an exhaust device for a fuel cell.

BACKGROUND

A fuel cell device is a device that produces electricity by electrochemically reacting hydrogen obtained by reforming a hydrocarbon-based fuel and oxygen in air in a membrane electrode assembly (MEA) of a stack, and water and heat are generated during operation.

The fuel cell device includes a reformer that reforms the supplied fuel, a burner that supplies heat required for the reforming reaction, a heat exchanger and cooling water pipe for cooling the stack and recovering heat, a power converter that converts the produced DC current into AC current, and the like.

A plurality of individual devices and a pipe that allows to flow fluid (air, fuel, water) therebetween are complicatedly installed inside the case of the fuel cell device.

Korean Patent Publication No. 10-2012-0071288 discloses a fuel cell device having a stack module 10 including a stack 10A which is configured by stacking cells of fuel cell and produces electric power, a power converter 10B which converts the DC current produced in the stack 10A into AC current, and an ultrapure water heat exchanger 10C circulating an ultrapure water for cooling the stack 10A.

A fuel converter module 20 includes a reformer 20A that receives fuel gas and converts it into hydrogen gas, and a burner 20B that supplies heat required for the reforming reaction to the reformer 20A.

A BOP module 30 includes a first heat exchanger 30A for recovering heat from exhaust gas of the stack 10A, a second heat exchanger 30B for recovering heat from exhaust gas of the burner 20B, and a third heat exchanger 30C for recovering heat from the hydrogen gas discharged from the reformer 20A.

A heat storage module 40 includes a hot water tank 40A for recovering and storing heat by circulating storage water to the ultrapure water heat exchanger 10C of the stack module 10, the first heat exchanger 30A, the second heat exchanger 30B, and the third heat exchanger 30C. That is, the hot water tank 40A performs a heat storage function.

A stack exhaust gas inflow pipe 83 is connected between an exhaust gas outlet of the stack 10A and an core inlet of the first heat exchanger 30A, and a stack exhaust gas discharge pipe 84 is connected to an core outlet of the first heat exchanger 30A.

A hydrogen gas inflow pipe 87 is connected between the hydrogen gas outlet of the reformer 20A and the core inlet of the third heat exchanger 30C, and a hydrogen gas discharge pipe 88 is connected between the core outlet of the third heat exchanger 30C and the hydrogen gas inlet of the stack 10A.

However, the complexity of system of such a fuel cell device is increased by separately configuring the exhausts of the stack and the reformer combustion, and if they are merged as a single exhaust, the output is not uniform due to the interference of a flow path, and parasitic power due to valve control for draining condensate water is generated.

SUMMARY

The present disclosure has been made in view of the above problems, and provides an exhaust device for a fuel cell system having improved flow path interference.

The present disclosure further provides an exhaust device for a fuel cell system that provides a uniform output.

The present disclosure further provides an exhaust device for a fuel cell system capable of improving parasitic power that may occur during valve control.

In accordance with an aspect of the present disclosure, a fuel cell exhaust device includes: a pipe having one side open and the other side closed; a water tank having one side open and the other side closed, wherein the closed other side of the pipe is inserted into the open one side of the water tank to cover a part of an outer circumferential surface of the pipe; a reformer exhaust pipe communicating with the pipe between one side and the other side of the pipe; a stack exhaust pipe which is spaced apart from the reformer exhaust pipe and communicates with the pipe between one side and the other side of the pipe; a drain pipe which is positioned adjacent to the reformer exhaust pipe or the stack exhaust pipe, and formed on an outer circumferential surface of the water tank to communicate with the inside of the water tank; and a hole which is formed on the closed other side of the pipe and spaced apart from the closed other side of the water tank.

In accordance with another aspect of the present disclosure, the fuel cell exhaust device further includes a valve installed in the drain pipe.

In accordance with another aspect of the present disclosure, the valve closes the drain pipe when power is applied and opens the drain pipe when power is released.

In accordance with another aspect of the present disclosure, the fuel cell exhaust device further includes a sensor installed in the water tank and detecting a water level of condensate water collected in the water tank.

In accordance with another aspect of the present disclosure, the fuel cell exhaust device further includes a controller for obtaining water level information of the condensate water from the sensor, and applying or releasing power to the valve, and the controller applies power to the valve when the water level of the condensate water is lower than a height of the hole of the pipe from the closed other side of the water tank, and releases power to the valve when the water level of the condensate water is higher than the height of the hole of the pipe from the closed other side of the water tank.

In accordance with another aspect of the present disclosure, a diameter of the pipe is smaller than a diameter of the water tank, and a diameter of the stack exhaust pipe or the reformer exhaust pipe is smaller than the diameter of the pipe.

In accordance with another aspect of the present disclosure, the drain pipe is adjacent to open one side of the water tank and communicates with the water tank.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated. In general, suffixes such as "module" and "unit" may be used to refer to elements or components. Use of such suffixes herein is merely intended to facilitate description of the specification, and the suffixes do not have any special meaning or function. In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings. It will be understood that although the terms first, second, etc. may be used herein to describe various elements, these elements should not be limited by these terms. These terms are only used to distinguish one element from another. It will be understood that when an element is referred to as being "connected with" another element, there may be intervening elements present. In contrast, it will be understood that when an element is referred to as being "directly connected with" another element, there are no intervening elements present. A singular representation may include a plural representation unless context clearly indicates otherwise. Terms such as "includes" or "has" used herein should be considered as indicating the presence of several components, functions or steps, disclosed in the specification, and it is also understood that more or fewer components, functions, or steps may likewise be utilized.

Figure 1:
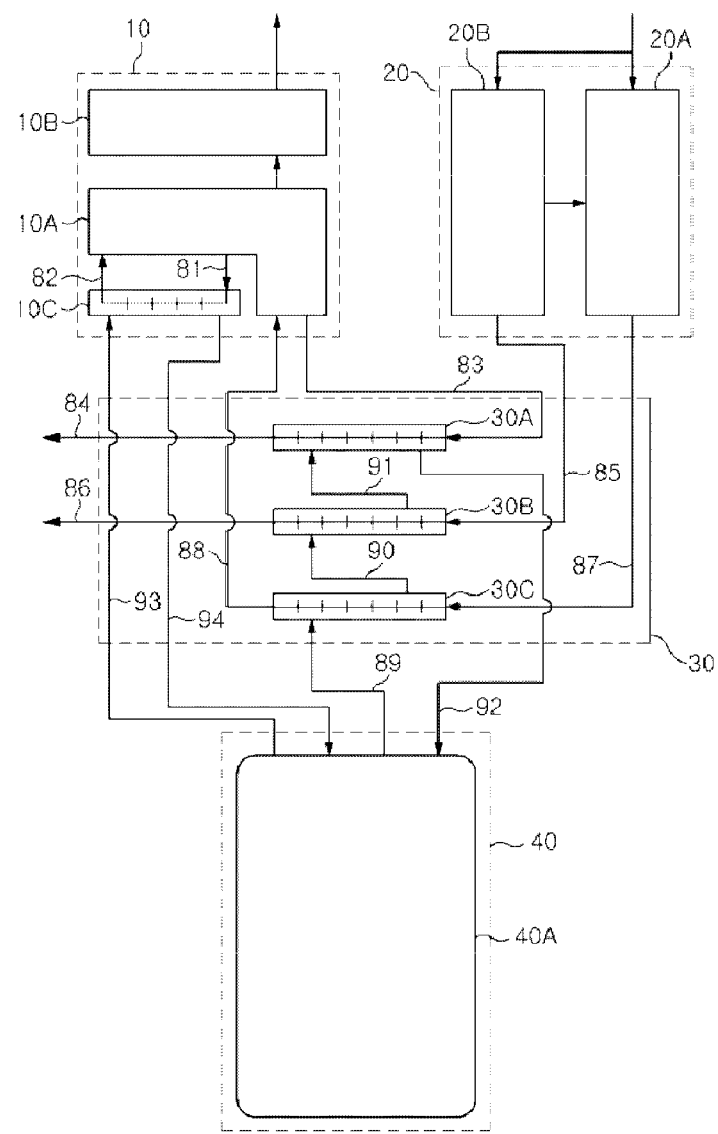
FIG. 1 is a view showing an example of a conventional fuel cell system related to the present disclosure.
Figure 2:
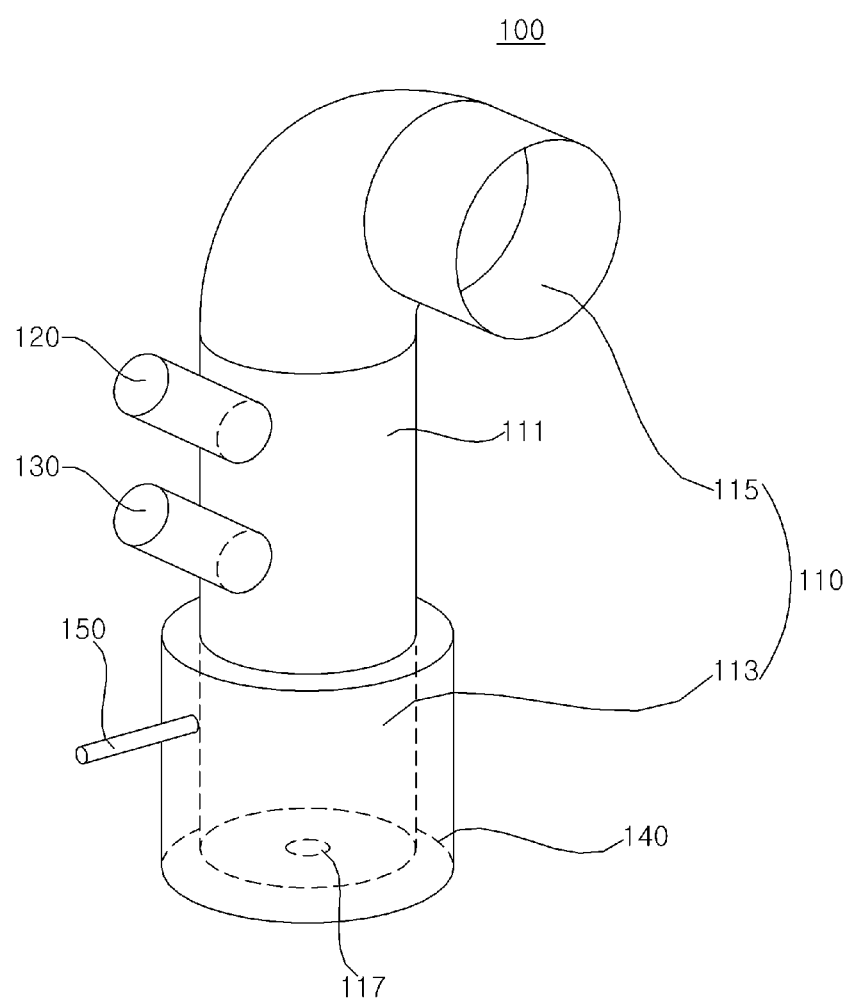
FIG. 2 is a view showing an example of an exhaust device of a fuel cell system according to an embodiment of the present disclosure.

Referring to FIG. 2, a pipe 110 may include a first part 111, a second part 113, and a third part 115. A reformer exhaust pipe 120 and a stack exhaust pipe 130 may communicate with the pipe 110. The first part 111 may be a pipe having open top and bottom. The reformer exhaust pipe 120 may communicate with the first part 111 of the pipe 110, and the stack exhaust pipe 130 may communicate with the first part 111 of the pipe 110. The reformer exhaust pipe 120 and the stack exhaust pipe 130 may be disposed vertically on the first part 111 of the pipe 110, and may be spaced apart from each other.

For example, the diameter of the first part 111 may be three or more times larger than the diameter of the reformer exhaust pipe 120. For another example, the diameter of the first part 111 may be three or more times larger than the diameter of the stack exhaust pipe 130.

Accordingly, interference may not occur in a exhaust flow combined from the reformer exhaust pipe 120 and the stack exhaust pipe 130 to the pipe 110.

The second part 113 of the pipe 110 may communicate with the first part 111 in a lower portion of the first part 111. The second part 113 may be a pipe having a closed bottom and an open top. The diameter of the second part 113 may be substantially the same as the diameter of the first part 111. A hole 117 may be formed in a lower surface of the second part 113. For example, the diameter of the hole 117 may be ⅓ or less of the diameter of the second part 113.

The third part 115 of the pipe 110 may communicate with the first part 111 in the upper portion of the first part 111. The third part 115 may be a pipe having open top and bottom. The third part 115 may be formed to be bent from the first part 111. For example, the diameter of the third part 115 may be substantially the same as the diameter of the first part 111.

A water tank 140 may cover the outer diameter of the lower portion of the pipe 110. The water tank 140 may have a pipe shape having a closed lower surface and an open upper surface. For example, the height of the water tank 140 may be the same as the height of the second part 113. The lower surface of the water tank 140 may be spaced apart from the lower surface of the second part 113. The inner circumferential surface of the water tank 140 may be spaced apart from the outer circumferential surface of the second pipe 113.

A drain pipe 150 may communicate with the inside of the water tank 140 through the outer circumferential surface of the water tank 140. The drain pipe 150 may be located adjacent to the upper surface of the opened water tank 140.

Figure 3:
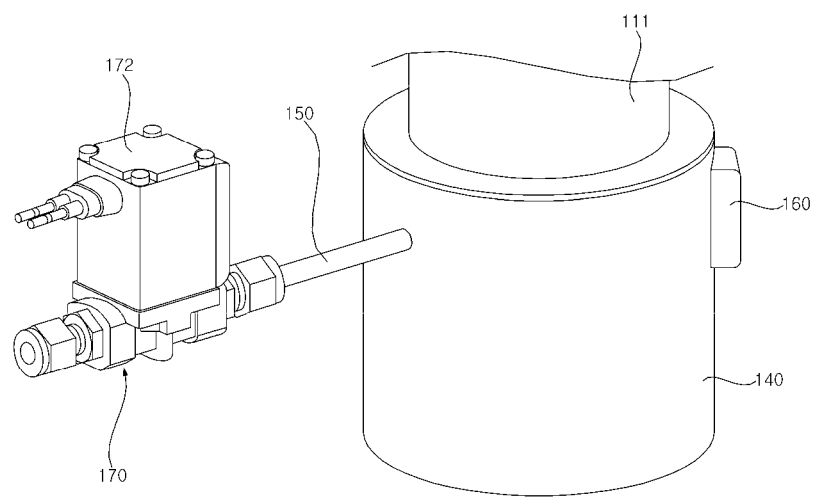
FIG. 3 is a view showing an example of a valve structure of a fuel cell system according to an embodiment of the present disclosure.

Referring to FIG. 3, the sensor 160 may be installed in the water tank 140. The sensor 160 may be a water level sensor. For example, the sensor 160 may be a capacitive sensor. The valve 170 may be installed in the drain pipe 150. The valve 170 may be a valve that is electrically opened and closed 172. For example, the valve 170 may be a valve that is closed when a current is applied, and is open when the current is released. The valve 170 may be adjusted by the water level detected by the sensor 160.

Figure 4:
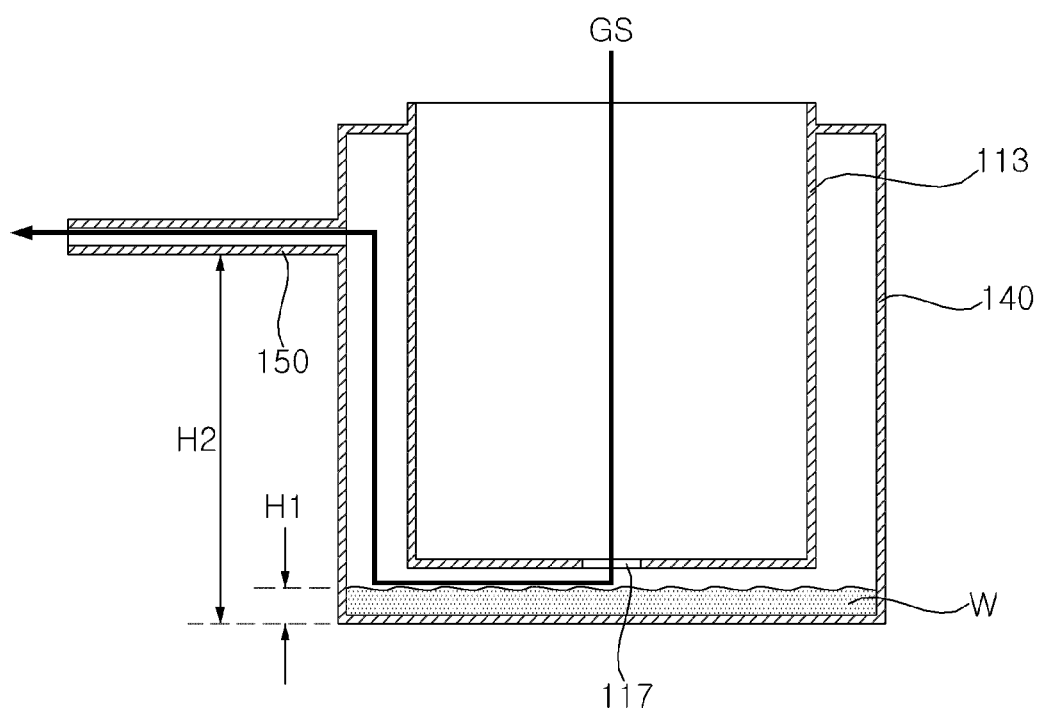
FIGS. 4 to 6 are views showing examples of a condensate water discharge structure of a fuel cell system according to an embodiment of the present disclosure.

Referring to FIG. 4, water (hereinafter, condensate water, W) condensed in the exhaust gas GS may be collected in the water tank 140 through the hole 117 of the second part 113 of the pipe 110. Condensate water W may form a constant water level H1 in the water tank 140. When the water level H1 of the condensate water W is lower than the height of the hole 117 of the second part 113 (when the fuel cell is initially driven), the exhaust gas GS may flow to the discharge pipe 150 through the hole 117 of the second part 113. To prevent this, the valve 170 (see FIG. 3) may be closed. For example, the valve 170 may close the discharge pipe 150 by applying a current to the valve 170.

Figure 5:
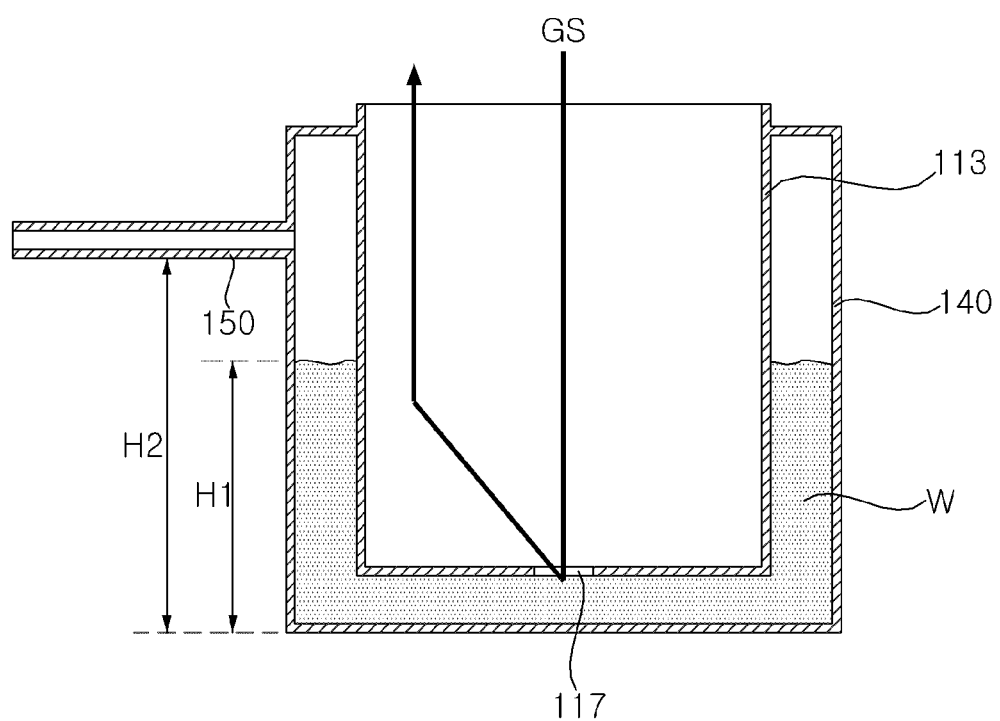

Referring to FIG. 5, when the condensate water W forms a water level H1 higher than the hole 117 of the second part 113 in the water tank 140, the exhaust gas GS cannot flow to the tank 140 through the hole 117. The condensate water W may serve as a sealing water for the exhaust gas GS. The exhaust gas GS that cannot flow to the outside of the second part 113 through the hole 117 may flow to the first part 111 and/or the third part 115 of the pipe 110 (see FIG. 2). At this time, the valve 170 (see FIG. 3) may be opened.

Even if the valve 170 is opened, the condensate (W) serves as a sealing water to prevent the exhaust gas GS from flowing to the water tank 140 through the hole 117. Therefore, it is possible to prevent the exhaust gas GS from being discharged to the discharge pipe 150 even when the valve 170 opens the discharge pipe 150. For example, the valve 170 may open the discharge pipe 150 by releasing the current to the valve 170. At this time, the water level H1 of the condensate water W may be higher than the height of the hole 117 of the second part 113 and lower than the height H2 of the discharge pipe 150.

Figure 6:
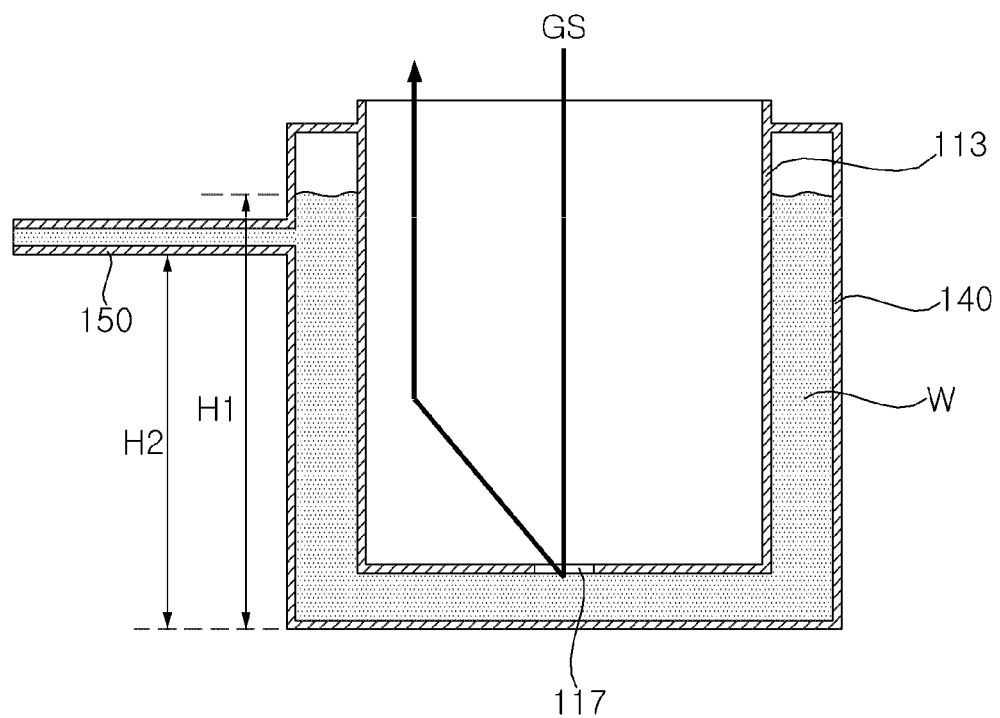
Figure 7:
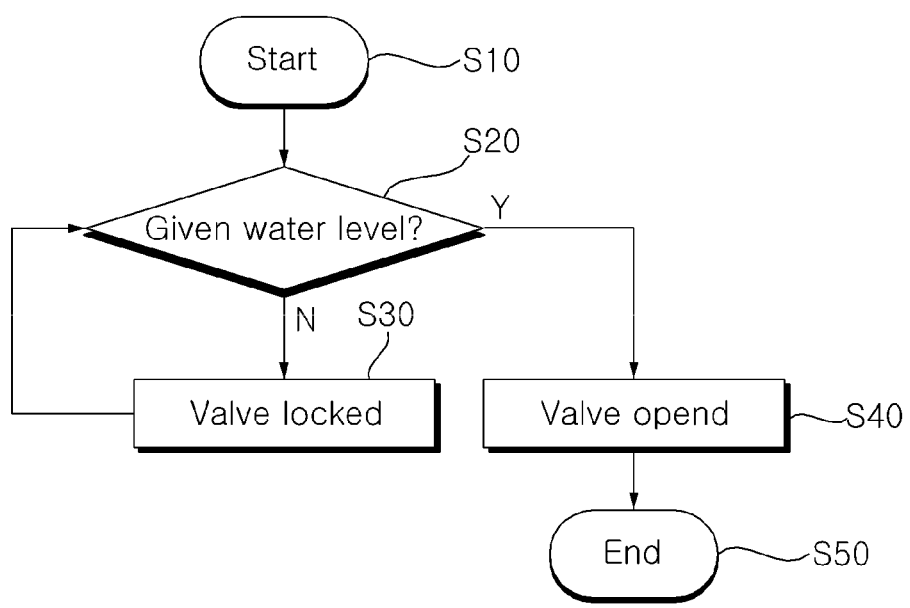
FIG. 7 is a view showing an example of a valve control according to an embodiment of the present disclosure.

Referring to FIG. 6, when the water level H1 of the condensate water W becomes higher than the height H2 of the discharge pipe 150, the condensate water W may be drained to the outside through the discharge pipe 150. For example, the valve 170 may still be in a no-current state. The condensate water W may be discharged until the water level H1 of the condensate water W becomes equal to the height H2 of the discharge pipe 150, and if the water level H1 of the condensate water W is smaller than the height H2 of the discharge pipe 150, the condensate water W may not be discharged. In addition, when the water level H1 of the condensate water W is greater than the height of the hole 117 of the second part 113, the valve 170 may maintain an open state without current.

Referring to FIGS. 3 to 7, the sensor 160 may detect the water level H1 of the condensate water W (S10). A controller may operate the valve 170 according to the water level H1 of the condensate water W detected by the sensor 160 (S20). When the water level H1 of the condensate water W is smaller than the height of the hole 117 of the second part 113, the valve 170 may maintain a locked state formed as current is applied (S30). When the water level H1 of the condensate water W is higher than the height of the hole 117 of the second part 113, the valve 170 may maintain an open state formed as no current is applied (S40, S50). Accordingly, parasitic power consumption for operating the valve 170 may be prevented.

As described above, according to at least one embodiment of the present disclosure, it is possible to provide an exhaust device for a fuel cell system having improved flow path interference.

According to at least one embodiment of the present disclosure, it is possible to provide an exhaust device for a fuel cell system that provides a uniform output.

According to at least one embodiment of the present disclosure, it is possible to provide an exhaust device for a fuel cell system capable of improving parasitic power that may occur during valve control.

Certain embodiments or other embodiments of the disclosure described above are not mutually exclusive or distinct from each other. Any or all elements of the embodiments of the disclosure described above may be combined or combined with each other in configuration or function.

For example, a configuration W described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fuel cell exhaust device comprising:
    a pipe having one side open and the other side closed;
    a water tank having one side open and the other side closed, wherein the closed other side of the pipe is inserted into the open one side of the water tank to cover a part of an outer circumferential surface of the pipe;
    a reformer exhaust pipe communicating with the pipe between one side and the other side of the pipe;
    a stack exhaust pipe which is spaced apart from the reformer exhaust pipe and communicates with the pipe between one side and the other side of the pipe;
    a drain pipe which is positioned adjacent to the reformer exhaust pipe or the stack exhaust pipe, and formed on an outer circumferential surface of the water tank to communicate with the inside of the water tank; and
    a hole which is formed on the closed other side of the pipe and spaced apart from the closed other side of the water tank.

2. The fuel cell exhaust device of claim 1, further comprising a valve installed in the drain pipe.

3. The fuel cell exhaust device of claim 2, wherein the valve closes the drain pipe when power is applied and opens the drain pipe when power is released.

4. The fuel cell exhaust device of claim 3, further comprising a sensor installed in the water tank and detecting a water level of condensate water collected in the water tank.

5. The fuel cell exhaust device of claim 4, further comprising a controller for obtaining water level information of the condensate water from the sensor, and applying or releasing power to the valve,
    wherein the controller applies power to the valve when the water level of the condensate water is lower than a height of the hole of the pipe from the closed other side of the water tank, and releases power to the valve when the water level of the condensate water is higher than the height of the hole of the pipe from the closed other side of the water tank.

6. The fuel cell exhaust device of claim 1, wherein a diameter of the pipe is smaller than a diameter of the water tank, and
    a diameter of the stack exhaust pipe or the reformer exhaust pipe is smaller than the diameter of the pipe.

7. The fuel cell exhaust device of claim 6, wherein the drain pipe is adjacent to open one side of the water tank and communicates with the water tank.

* * * * *